(12) United States Patent
He et al.

(10) Patent No.: US 11,556,479 B1
(45) Date of Patent: Jan. 17, 2023

(54) CACHE BLOCK BUDGETING TECHNIQUES

(71) Applicant: Micron Technology, Inc., Boise, ID (US)

(72) Inventors: Deping He, Boise, ID (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/397,799

(22) Filed: Aug. 9, 2021

(51) Int. Cl.
*G06F 12/00* (2006.01)
*G06F 12/0893* (2016.01)

(52) U.S. Cl.
CPC .. *G06F 12/0893* (2013.01); *G06F 2212/1044* (2013.01); *G06F 2212/6012* (2013.01)

(58) Field of Classification Search
CPC ....... G06F 3/0629; G06F 3/0655; G06F 3/067
See application file for complete search history.

(56) References Cited

U.S. PATENT DOCUMENTS

| | | | | |
|---|---|---|---|---|
| 10,359,933 | B2 * | 7/2019 | Muchherla | G06F 11/348 |
| 10,503,792 | B1 * | 12/2019 | Frieder | G06F 12/0871 |
| 2003/0093622 | A1 * | 5/2003 | Desota | G06F 12/0848 |
| | | | | 711/E12.018 |
| 2016/0328131 | A1 * | 11/2016 | Belcsik | G06T 17/05 |
| 2016/0364337 | A1 * | 12/2016 | Hale | G06F 12/0897 |
| 2018/0081543 | A1 * | 3/2018 | Muchherla | G06F 3/0653 |
| 2018/0081811 | A1 * | 3/2018 | Al Sheikh | G06F 12/0846 |
| 2021/0011767 | A1 * | 1/2021 | Luo | G06F 3/0634 |
| 2021/0042236 | A1 * | 2/2021 | Cariello | G06F 12/0246 |

\* cited by examiner

*Primary Examiner* — Shawn X Gu
*Assistant Examiner* — Mohammad S Hasan
(74) *Attorney, Agent, or Firm* — Holland & Hart LLP

(57) ABSTRACT

Methods, systems, and devices for cache block budgeting techniques are described. In some memory systems, a controller may configure a memory device with a cache. The cache may include a first subset of blocks configured to statically operate in a first mode and a second subset of blocks configured to dynamically switch between operating in the first mode and a second mode. A block operating in the second mode may be configured to store relatively more bits per memory cell than a block operating in the first mode. The controller may track and store, for each block of the second subset of blocks, a respective ratio of cycles performed in the first mode to cycles performed in the second mode. The controller may select a block from the second subset of blocks to switch between modes responsive to a trigger and based on the respective ratio for the block.

25 Claims, 6 Drawing Sheets

CACHE BLOCK BUDGETING TECHNIQUES

FIELD OF TECHNOLOGY

The following relates generally to one or more systems for memory and more specifically to cache block budgeting techniques.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
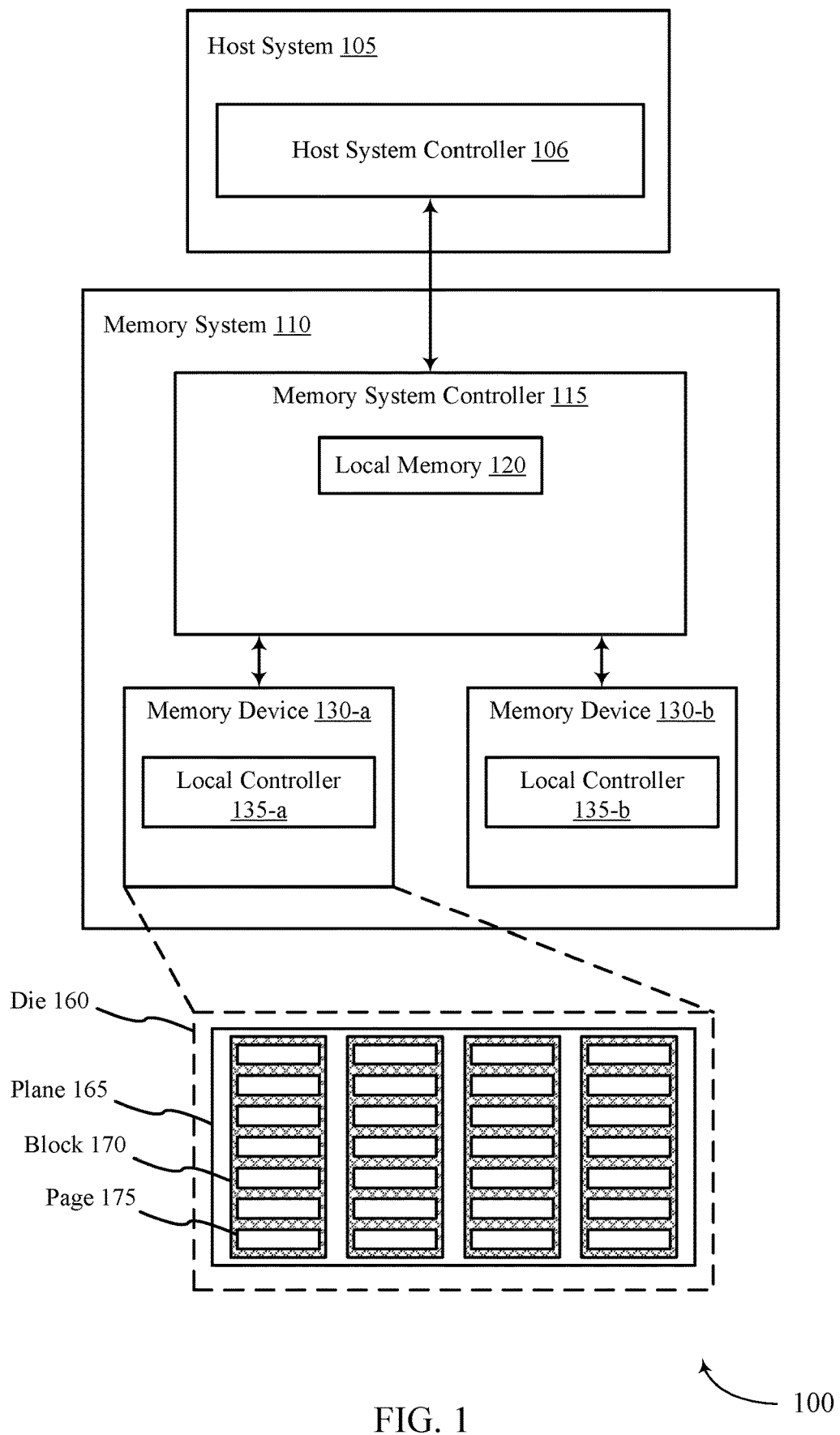
FIG. 1 illustrates an example of a system that supports cache block budgeting techniques in accordance with examples as disclosed herein.

Some memory devices, such as NAND memory, may include a cache that includes subsets of memory cells (e.g., in a memory array) for storing data or other information. In some examples, the cache may include blocks of memory that may support fewer bits per cell than other blocks in the memory device. For example, the cache may include one or more single level cell (SLC) blocks, which may include relatively fewer bits per cell than other blocks, such as blocks including multi-level cells (MLC), triple-level cells (TLC), quad-level cells (QLC), penta-level cells (PLC), etc., or any combination of these or other multiple-level memory cells. Such a cache may improve endurance and performance of the memory device due to the improved performance of the blocks that support fewer bits per cell (e.g., relatively higher reliability, relatively faster access operations, relatively greater endurance) as compared to the other blocks for data storage. In some cases, however, the cache may be associated with reduced capacity for the memory device (e.g., due to storing fewer bits per cell than blocks outside the cache), which may result in decreased memory device storage capacity and performance for some operations such as wear leveling, garbage collection, or the like (e.g., operations that may benefit from an overprovisioning pool of blocks or resources to be used).

As described herein, the cache may include a subset of dynamic blocks that may be able to switch between a first mode that supports relatively fewer bits per cell (e.g., SLC, MLC, TLC) and a second mode that supports relatively more bits per cell (e.g., MLC, TLC, or QLC). In some examples, a program and erase (P/E) cycle performed on a dynamic block in the second mode may wear the block more than a P/E cycle in the first mode (e.g., due to the greater quantity of bits per cell corresponding to the second mode). A memory system controller may configure the cache to support a target total bytes written (TBW) in accordance with a target capacity for the memory device. The memory system controller may configure, for at least some if not each dynamic block in the cache and in accordance with the target TBW for the cache, a target ratio between cycles performed in the first mode and cycles performed in the second mode. The target ratio may correspond to a first target cycle count for the first mode and a second target cycle count for the second mode in some examples. As the memory device is used (e.g., during product runtime), the memory system controller may track the cycle counts for each dynamic block in the cache. If the memory system controller identifies a trigger to select one or more dynamic blocks to switch from the first mode to the second mode (or from the second mode to the first mode), the memory system controller may select the one or more dynamic blocks based on or in response to the cycle counts, a target cycling ratio for the respective blocks, or both. The trigger may be, for example, a capacity of the memory device satisfying (e.g., exceeding or being equal to) or falling below a target capacity of the memory device, a write command for the cache, an erase command for the cache, or any combination thereof.

Additionally or alternatively, the memory system controller may be configured to modify a target cycling ratio for one or more dynamic blocks based on or in response to a level of usage of the cache (e.g., by a host system). During runtime, the memory system controller may periodically compare a TBW to the cache with the target TBW for the cache. If the actual TBW is different from the target TBW (e.g., for a specific time period), the memory system controller may determine to adjust (e.g., increase or decrease) the target cycling ratio for one or more dynamic blocks. As such, the memory system controller may utilize one or more processes to improve allocation of blocks within a cache, which may improve performance and endurance of a memory device while maintaining capacity targets for the memory device.

Figure 2:
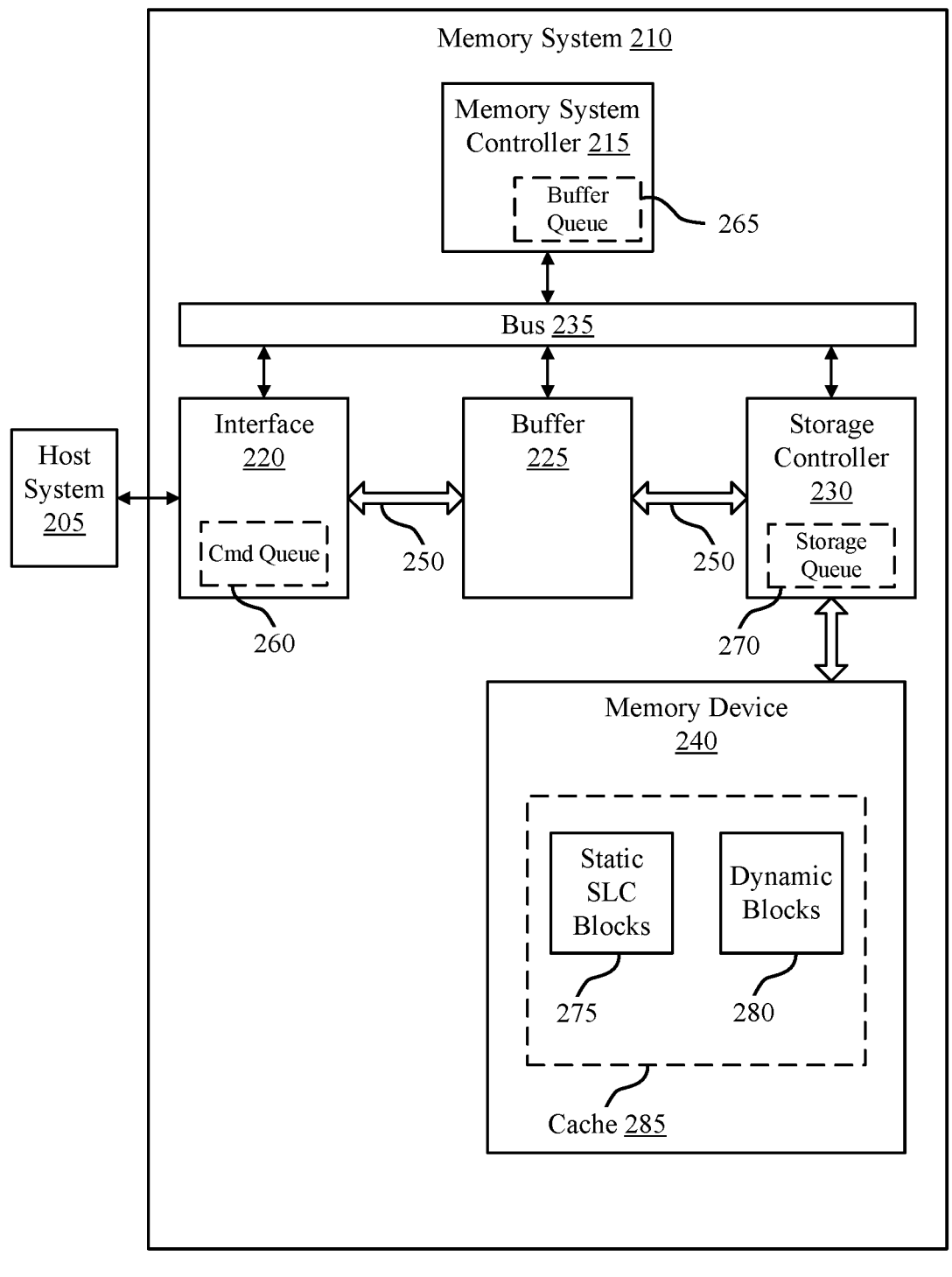
FIG. 2 illustrates an example of a system that supports cache block budgeting techniques in accordance with examples as disclosed herein.

Features of the disclosure are initially described in the context of systems and devices with reference to FIGS. 1 and 2. Features of the disclosure are described in the context of memory systems and process flows with reference to FIGS. 3 and 4. These and other features of the disclosure are further illustrated by and described in the context of an apparatus diagram and flowchart that relate to cache block budgeting techniques with reference to FIGS. 5 and 6.

FIG. 1 illustrates an example of a system 100 that supports cache block budgeting techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open not-and (NAND) Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage (e.g., increased capacity) relative to SLC memory but may, in some cases, involve narrower read or write margins or greater complexities for supporting circuitry. In some examples, SLC memory may be associated with higher reliability, faster access operations, improved endurance, and the like, than multiple-level memory cells.

Some memory devices 130 may include static SLC memory cells, which may operate in an SLC mode throughout a lifetime of the memory device 130. Static SLC memory cells may support relatively high reliability and endurance for the memory device 130, but may be associated with a lower density of storage than other memory cells. As a quantity of data written to the memory device 130 (e.g., a level of usage of the memory device 130) increases, the capacity of the memory device 130 may decrease (e.g., an over-provisioning pool that includes available memory cells within the memory device 130 may decrease). As such, a memory device 130 that includes a relatively large quantity of static SLC memory cells may store a relatively low quantity of data (e.g., a low capacity). To maintain sufficient capacity within a memory device 130 while improving endurance and performance, a memory device 130 may include one or more dynamic memory cells. The one or more dynamic memory cells may be programmed as SLC memory cells or multiple-level memory cells (e.g., MLC, TLC, QLC, PLC, etc.).

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105). In some examples, performance of a memory device 130 during garbage collection and wear leveling operations may be referred to as dirty performance.

In some examples, an overprovisioning pool within the memory device 130 may include the free blocks 170 (e.g., blocks 170 that are not currently storing data) that are erased during such operations, which may improve efficiency and reliability of the media management operations for the memory device 130. As a level of usage of the memory device 130 increases, a capacity of available blocks within the memory device 130 (e.g., and a corresponding capacity of the overprovisioning pool) may decrease, which may result in reduced performance (e.g., dirty performance). In some examples, a memory device 130 may include a cache that includes blocks 170 that support a first mode of operation (e.g., SLC memory). The first mode may support fewer bits per memory cell than a second mode (e.g., multiple-level cell memory) and may be associated with reduced capacity. As such, if a memory device 130 includes a cache of blocks that operate in the first mode, a capacity of the device may be reduced, which may result in reduced overprovisioning and reduced performance of the memory device 130.

A cache within a memory device 130 as described herein may be configured to include a first subset of blocks that are configured to operate in the first mode and a second subset of blocks that are configured to dynamically switch between operating in the first mode and the second mode, which may be referred to as dynamic blocks. The memory system controller 115 may configure the cache to support a target TBW based on or in response to a target capacity for the memory device 130. The memory system controller 115 may configure, for each dynamic block in the cache, a target cycle ratio associated with a first target cycle count for the first mode and a second target cycle count for the second mode in accordance with the target TBW (e.g., a total target TBW) for the cache. In some examples, a P/E cycle performed on a block in the second mode may wear a block more than a P/E cycle performed on the block in the first mode, and the target cycling ratio may be calculated according to a ratio of wear in the first mode to wear in the second mode to maintain sufficient endurance for each block 170.

As the memory device 130 is used by a host system 105, the memory system controller 115 may track the cycle counts for each dynamic block in the cache. If the memory system controller 115 identifies a trigger to select one or more dynamic blocks to switch from the first mode to the second mode or from the second mode to the first mode, the memory system controller 115 may select the one or more dynamic blocks based on or in response to the cycle counts and a target cycling ratio for the respective dynamic blocks. The trigger may be, for example, a capacity of the memory device 130 exceeding or falling below a target capacity of the memory device 130, a write command for the cache, an erase command for the cache, or any combination thereof. The memory system controller 115 may additionally or alternatively modify the target cycle ratios for one or more dynamic blocks in accordance with a level of usage of the cache. The memory system controller 115 may periodically compare an actual TBW with the target TBW for the cache. If the actual TBW is different from the target TBW (e.g., for a specific time period, at a specific reference time), the memory system controller 115 may determine to adjust (e.g., increase or decrease) the target cycling ratio for one or more dynamic blocks. As such, the memory system controller 115 may utilize one or more processes to improve allocation of dynamic blocks within a cache, which may improve performance and endurance of a memory device 130 while maintaining a capacity target for the memory device 130.

The system 100 may include any quantity of non-transitory computer readable media that support cache block budgeting techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

FIG. 2 illustrates an example of a system 200 that supports cache block budgeting techniques in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205, e.g., in response to receiving access commands from the host system 205, as described herein. The one or more memory devices 240 may examples of the memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from a memory device 240, e.g., for storing data, retrieving data, and determining memory locations in which to store data and from which to retrieve data. The storage controller 230 may communicate with the one or more memory devices 240 directly or via a bus (not shown) using a protocol specific to each type of memory device 240. In some cases, a single storage controller 230 may be used to control multiple memory devices 240 of the same or different types.

In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory device 240. The interface 220, buffer 225, and storage controller 230 may be for translating data between the host system 205 and the memory device 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components. In some examples, the memory system controller 215 may be an example of a processor associated with an ASIC. For example, the system 200 may include multiple memory dies. A first memory die (e.g., an ASIC controller die) may include the interface 220, the buffer 225, the storage controller 230, or a combination thereof and may be controlled by the memory system controller 215. In some cases, the first memory die may additionally include the memory system controller 215. A second memory die may include one or more memory devices 240 and may include a local controller (not shown). The memory dies may communicate with each other using the bus 235.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the one or more memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to a memory device 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to the memory device 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the one or more memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., using the bus 235, that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

As described with reference to FIG. 1, a memory device 240 may include a cache 285 to improve performance of the memory device 240. The cache 285 may include blocks that may be configured to operate in one or more modes. As described herein, a block operating in a first mode may store fewer bits per memory cell than a block operating in a second mode. For example, a block operating in the first mode may store data in an SLC and a block operating in the second mode may store data in a multiple-level memory cell (e.g., MLC, TLC, or QLC). In some examples, a block operating in the first mode may store data in an MLC and a block operating in the second mode may store data in a TLC or QLC. Additionally or alternatively, a block operating in the first mode may store data in a TLC and a block operating in the second mode may store data in a QLC.

In some cases, a memory device 240 (e.g., a NAND memory device 240) that includes a large quantity of blocks that operate in the second mode may perform slower operations than a memory device 240 that includes fewer blocks that operate in the second mode. Accordingly, the memory device 240 may use a cache 285 including blocks operating in the first mode to handle relatively low latency procedures. For example, the cache 285 may store frequently-read data or recently-read data to support relatively low latency read operations. Additionally or alternatively, the memory system 210 may initially write data to the cache 285 to support relatively low latency write operations before moving the data from the cache 285 to other memory cells (e.g., higher capacity memory cells of the memory device 240, such as TLCs). Different quantities of bits per memory cell may support different endurances and, correspondingly, different quantities of P/E cycles. In one example, an SLC block may support 100,000 P/E cycles, an MLC block may support 30,000 P/E cycles, a TLC block may support 8,000 P/E cycles, and a QLC block may support 2,000 P/E cycles over the lifetime of each respective block. As such, blocks that operate according to the first mode (e.g., blocks that store fewer bits per memory cell) may support a higher TBW than other blocks.

To improve performance and endurance, some memory devices 240 may employ the cache 285 including blocks that are configured to statically operate in the first mode, such as the static SLC blocks 275. The static SLC blocks 275 may operate according to the first mode for a lifetime of the blocks and may support more endurance and reliability than other blocks in the memory device 240. Although the cache 285 including the static SLC blocks 275 may store less data than another cache that includes other blocks, the cache 285 may last longer and may support more data cycling (e.g., more write operations and more TBW) than another cache. In some examples, however, the reduced data storage associated with the cache 285 may reduce a capacity of the memory device 240. For example, each static SLC block 275 within the cache 285 may store relatively less information than other blocks of the memory device 240 and may be removed from an overprovisioning pool for the memory device 240 (e.g., a pool of free blocks). Accordingly, the cache 285 may reduce overprovisioning, increase a write amplification factor, and degrade performance (e.g., dirty performance) of the memory device 240.

To support a balance between endurance of the memory device 240 and sufficient overprovisioning for the memory device 240, at least a portion of the cache 285 may include dynamic blocks 280. Each dynamic block 280 may be programmed according to the first mode or the second mode for each P/E cycle performed on the respective block. In some cases, a P/E cycle that is performed according to the second mode may decrease an endurance of the dynamic block 280 relatively more than a P/E cycle performed according to the first mode. For example, if data is written to a dynamic block 280 in the second mode one or more times, a total quantity of PIE cycles (e.g., a TBW) supported by the dynamic block 280 may be reduced to be less than a total quantity of P/E cycles supported by a block that operates in the first mode (e.g., an SLC block). Some systems may handle such a dynamic block 280 (e.g., switching between storing data in SLCs and multiple-level cells) as if the block supports a same total quantity of P/E cycles as a block statically storing data in the multiple-level cells. However, such a system may fail to effectively account for the endurance gains provided by the dynamic block 280 periodically or aperiodically storing data in the SLCs. The degradation of endurance due to P/E cycles in the second mode may be a product of wear leveling or other procedures performed to combat the storage of data in the second mode (e.g., the second mode may wear on a block more than the first mode).

As described herein, a memory system controller 215 may calculate a ratio of cycles in the first mode to cycles in the second mode that may be supported by each dynamic block 280 (e.g., a single cycle in the second mode may wear the block by an amount that corresponds to the calculated ratio as compared to a single cycle in the first mode). The memory system controller 215 may utilize the calculated ratio and a process (e.g., an algorithm) to configure the cache 285 to include a subset of the dynamic blocks 280 and to determine whether to program each dynamic block 280 in the first mode or the second mode as the cache 285 is in use, which may provide for a target quantity of P/E cycles to be performed on each dynamic block 280 while a target endurance of each dynamic block 280 is maintained. A process for efficiently configuring and dynamically allocating blocks in a cache 285 is described herein and in further detail with reference to FIG. 4.

The memory system controller 215 may configure the cache 285 with one or more static SLC blocks 275, dynamic blocks 280, other blocks, or any combination thereof to achieve a balance between performance, endurance, and capacity for the memory device 240. The memory system controller 215 may identify a quantity of blocks that support the second mode (e.g., blocks that include multiple-level cells) may be allocated within the memory device 240 to achieve a target capacity for the memory device 240 (e.g., a threshold capacity to maintain sufficient overprovisioning and storage capacity). The memory system controller 215 may allocate remaining blocks to the cache 285 to improve performance of the memory device 240. The memory system controller 215 may configure a target TBW for the cache 285 (e.g., a target quantity of data that the cache 285 may support) in accordance with a target capacity and endurance for the memory device 240. In some examples, the cache 285 may be allocated with a first quantity of static SLC blocks 275 and a second quantity of dynamic blocks 280 to support the target TBW for the cache 285.

The memory system controller 215 may configure a target ratio of cycles performed in the first mode to cycles performed in the second mode for each dynamic block 280 in the cache 285. The target ratio, which may be referred to as a target cycling ratio, may correspond to a respective first target count for P/E cycles in the first mode and a respective second target count for P/E cycles in the second mode. The target cycling ratio may be calculated for each dynamic block 280 in the cache 285 to achieve a balance between endurance and performance of the cache 285 (e.g., the target TBW) and capacity targets for the memory device 240. For example, each dynamic block 280 may be configured to operate in the first mode for a first percentage of cycles and in the second mode for a second percentage of cycles, where the first and second percentages may be calculated such that the dynamic block 280 may support a target TBW (e.g., a target endurance for the cache 285, the memory device 240, or both). In some cases, the memory system controller 215 may configure a target ratio for each block of the cache 285, where the static SLC blocks 275 are allocated zero cycle counts for the second mode. In some examples, the cache 285, the target TBW for the cache 285, the target cycling ratios, or any combination thereof may be configured (e.g., pre-configured) during design of the memory device 240.

In some examples, the configured parameters for the cache 285 may be determined by the memory system controller 215 or some other component or controller in accordance with a characterization operation (e.g., a NAND characterization operation), a process (e.g., an algorithm), or both. The parameters may be calculated and determined to meet the target TBW for the memory device 240 while reducing an allocation of the static SLC blocks 275 (e.g., minimizing the allocation of the static SLC blocks 275) within the cache 285 (e.g., to obtain zero, or close to zero, static SLC blocks 275 within the cache 285).

Although endurance and performance of the cache 285 may be improved by configuring the target TBW and target cycling ratios at design time (e.g., based on or in response to an estimated level of usage for a host system 205), some host systems 205 may write more data to the memory device 240 than other host systems, which may affect the configured parameters. For example, a first host system 205 may frequently write data to a memory device 240, store a relatively large quantity of data on the memory device 240, or both. A second host system 205 may write data to the memory device 240 less frequently than the first host system 205, store less data on the memory device 240 than the first host system 205, or both. The TBW to the memory device 240 by the first host system 205 (e.g., an actual TBW) may be higher than the target TBW for a specific time period or at a reference time (e.g., after a month of usage), and the target cycling counts for the cache 285 may not support the relatively high level of usage by the first host system 205 (e.g., the dynamic blocks 280 may operate in the second mode significantly more often than the first mode). Additionally or alternatively, the TBW to the memory device 240 by the second host system 205 may be less than the target TBW for the specific time period or at the reference time. Differences between the actual TBW and the target TBW may result in less endurance, or less capacity, or both, than if the target cycling counts are dynamically determined based on or in response to a level of usage of the memory device 240.

As described herein, the memory system controller 215 may dynamically switch modes for one or more of the dynamic blocks 280, adjust the configured target cycling ratio for one or more of the dynamic blocks 280, or both according to a level of usage of the memory device 240 (e.g., during product runtime). The memory system controller 215 may track a first quantity of PIE cycles performed on each dynamic block 280 in the cache 285 in the first mode and a second quantity of PIE cycles performed on each dynamic block 280 in the second mode. The memory system controller 215 may additionally or alternatively track a TBW to the cache 285. In some examples, the TBW may correspond to a total quantity of P/E cycles performed on the blocks in the cache 285. Additional aspects directed to components for tracking data associated with cache usage may be further described herein, including with reference to FIG. 3.

The memory system controller 215 may determine whether to program each dynamic block 280 in the cache 285 in the first mode or the second mode based on or in response to the target cycling ratio for the block. In some examples, the memory system controller 215 may monitor the target cycling ratio for the P/E cycles for each dynamic block 280 to determine whether to switch modes for the respective dynamic block 280. Additionally or alternatively, the memory system controller 215 may monitor for one or more triggers to switch a dynamic block 280 from the first mode to the second mode or from the second mode to the first mode. The one or more triggers may include a capacity of the memory device 240 satisfying a threshold capacity, the capacity of the memory device 240 failing to satisfy the threshold capacity, a write command for the memory device 240, an erase command for the memory device 240, or any combination thereof.

In one example, if the capacity of the memory device 240 to store data falls below the threshold capacity for the memory device 240, the memory device 240 or the memory system controller 215 may trigger one or more dynamic blocks 280 in the cache 285 to switch from the first mode to the second mode (e.g., to increase the capacity of the memory device 240 to satisfy the threshold capacity). If the capacity of the memory device 240 to store data exceeds the threshold capacity, the memory device 240 or the memory system controller 215 may trigger one or more dynamic blocks 280 in the cache 285 to switch from the second mode to the first mode (e.g., to increase performance while still satisfying the threshold capacity). Additionally or alternatively, each write or erase command received for the memory device 240 may trigger the memory system controller 215 to select one or more dynamic blocks 280 to switch modes. For example, if a command indicates to write data to the memory device 240, the memory system controller 215 may select one or more dynamic blocks 280 to switch from the first mode to the second mode. If a command indicates to erase data from the memory device 240, the memory system controller 215 may select one or more dynamic blocks 280 to switch from the second mode to the first mode.

The memory system controller 215 may select the one or more dynamic blocks 280 to switch from the first mode to the second mode or from the second mode to the first mode in accordance with the tracked cycling ratio and the target cycling ratio for the one or more dynamic blocks 280. The memory system controller 215 may identify a first set of one or more dynamic blocks 280 that are behind on the cycling ratio. For example, a ratio of cycles performed in the first mode to cycles performed in the second mode may be less than a target ratio for each block in the first set of dynamic blocks 280. The memory system controller 215 may identify a second set of one or more dynamic blocks 280 that are ahead on the cycling ratio. For example, a ratio of cycles performed in the first mode to cycles performed in the second mode may be greater than a target ratio for each block in the second set of dynamic blocks 280. If the memory system controller 215 identifies a trigger to switch dynamic blocks 280 from the second mode to the first mode, the memory system controller 215 may select one or more dynamic blocks 280 from the first set to program in the first mode. If the memory system controller 215 identifies a trigger to switch dynamic blocks 280 from the first mode to the second mode, the memory system controller 215 may select one or more dynamic blocks 280 from the second set to program in the second mode. Such a selection procedure may allow the dynamic blocks 280 to trend towards the target cycling ratio, support more efficient usage of the dynamic blocks 280.

In some examples, the memory system controller 215 may periodically (or aperiodically) determine whether to adjust the target cycling ratios for the dynamic blocks 280 based on or in response to a TBW to the cache 285 (e.g., an actual TBW to the cache 285 by a host system 205). The TBW to the cache 285 may correspond to data written to the cells operating in the first mode (e.g., the static SLC blocks 275 and dynamic blocks 280 operating as SLC blocks), which may support the relatively low latency operations of the cache 285. If the actual TBW to the cache 285 is greater than the target TBW for the cache 285, the memory system controller 215 may increase a target ratio of cycles performed in the first mode to cycles performed in the second mode for one or more of the dynamic blocks 280. The memory system controller 215 may thereby program relatively more dynamic blocks 280 in the first mode in the cache 285 to handle the increased wear by the host system 205, which may provide for a longer life of the cache 285 while supporting the relatively heavy workload (e.g., as compared to if the cycling targets were not adjusted). If the actual TBW to the cache 285 is less than the target TBW for the cache 285, the memory system controller 215 may decrease a target ratio of cycles performed in the first mode to cycles performed in the second mode for one or more of the dynamic blocks 280. The memory system controller 215 may thereby program relatively more dynamic blocks 280 in the second mode in the cache 285 to account for the cache 285 experiencing a relatively lower workload than expected (e.g., a lower workload than accounted for by the target TBW for the cache 285). The increased quantity of dynamic blocks 280 operating in the second mode may support increased total capacity for the memory device 240 and increased overprovisioning and improved performance of the memory device 240 for operations such as wear leveling, garbage collection, and the like (e.g., dirty performance), while still satisfying the actual workload of the cache 285. By adjusting one or more of the cycling targets based on or in response to the actual TBW for the cache 285, the memory system controller 215 may improve an allocation of blocks in the cache 285 to balance endurance, performance, and capacity for the memory device 240 in accordance with a level of usage of the cache 285, the memory device 240, or both.

Additionally or alternatively, the memory system controller 215 may determine whether to adjust the target cycling ratios for the dynamic blocks 280 in accordance with a wear leveling status of the dynamic blocks 280. Wear leveling may be tracked, for example, according to a quantity of erases performed on each dynamic block 280. In some examples, an adjusted wear leveling status may be calculated by applying a ratio between erases performed in the first mode to erases performed in the second mode to account for the increased wear on a dynamic block 280 operating in the second mode. Accordingly, a wear leveling process for one or more of the dynamic blocks 280 may indicate, to the memory system controller 215, that a quantity of erases for the one or more blocks is exceeding or falling below a threshold quantity, where the quantity may be calculated to account for erases performed in the first mode and the second mode. The memory system controller 215 may thereby adjust target cycling ratios for the one or more dynamic blocks 280 in accordance with the indicated wear leveling status.

A memory device 240 as described herein may be configured with a cache 285, a target TBW for the cache 285, and target ratios of cycles performed in the first mode and cycles performed in the second mode for each dynamic block 280 within the cache 285 (e.g., at design time). A memory system controller 215 may monitor a level of usage of the cache 285, the memory device 240, or both (e.g., at runtime) to dynamically adjust the allocation of the dynamic blocks 280, the target cycling ratios for the dynamic blocks 280, or both to improve performance and overprovisioning of the memory device 240.

Figure 3:
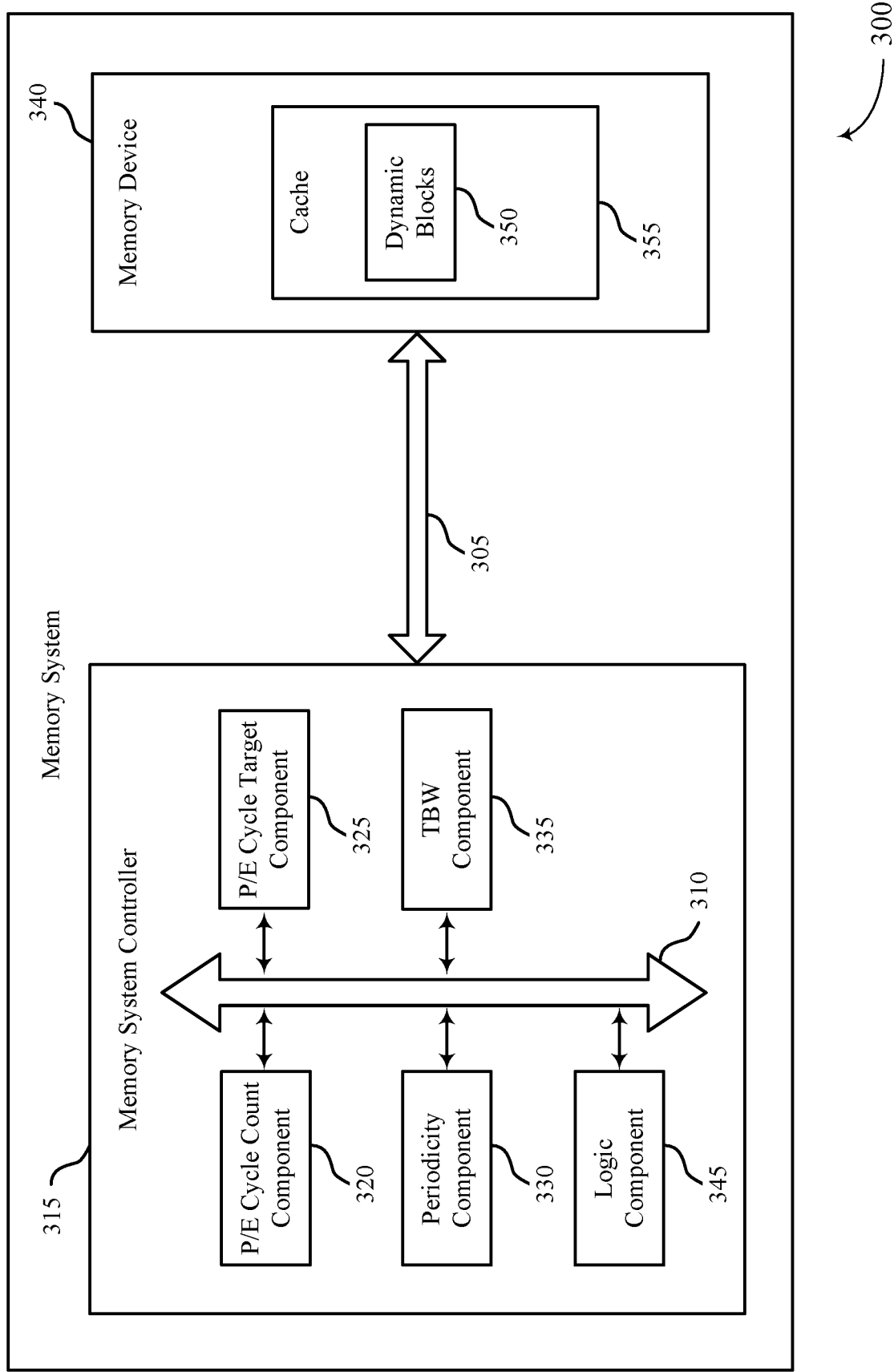
FIG. 3 illustrates an example of a memory system that supports cache block budgeting techniques in accordance with examples as disclosed herein.

FIG. 3 illustrates an example of a memory system 300 that supports cache block budgeting techniques in accordance with examples as disclosed herein. In some examples, the memory system 300 may implement aspects of the systems 100 and 200. For example, the memory system 300 may include a memory system controller 315 and a memory device 340, which may be examples of or include aspects of a memory system controller 215 and a memory device 240 as described with reference to FIGS. 1 and 2.

Although the various components of the memory system 300 are shown as separate for illustrative clarity, the components of the memory system 300 may be combined in any combination or additional components may be added. Further, the components may be located differently than shown (e.g., the components may be included in the memory system controller 315, or may be included in a storage controller, or may be included in the memory device 340, among other examples). In some examples, the operations described as being performed by one component may additionally or alternatively be performed by different components. In some examples, one or more parameters described as being stored in or configured by one component may additionally or alternatively be stored in or configured by different components (e.g., a parameter may be stored within a component of the memory system controller 315, within the cache 355, within a hard drive of the memory system 300, or elsewhere in the memory system 300).

The memory system 300 may include the memory system controller 315, the memory device 340, and a connection 305 for communicating commands between the memory system controller 315 and the memory device 340. The memory system controller 315, or various components thereof, may be configured to support cache block budgeting techniques for the cache 355 in the memory device 340. For example, the memory system controller 315 may include a P/E cycle count component 320, a P/E cycle target component 325, a periodicity component 330, a TBW component 335, a logic component 345, or any combination thereof. Each of these components may communicate, directly or indirectly, with one another via one or more buses 310. The memory device 340 may include a cache 355, which may be an example of the cache 285 as described with reference to FIG. 2. The cache 355 may include a first subset of blocks configured to statically operate according to a first mode (e.g., using SLC blocks), a second subset of blocks (e.g., the dynamic blocks 350) configured to dynamically switch between operating in the first mode and a second mode (e.g., using multiple-level memory cell blocks), one or more subsets of other blocks, or any combination thereof. The memory system 300 may support the first mode, the second mode, one or more other programming modes for the dynamic blocks 350 in the cache 355, or a combination thereof.

As described herein, including with reference to FIG. 2, the memory system controller 315 may configure the memory device 340 with the cache 355, a target TBW for the cache 355, a target ratio of cycles performed in the first mode to cycles performed in the second mode for each dynamic block 350 in the cache 355, or any combination thereof. The target ratio may, in some examples, correspond to a first target cycle count for the first mode and a second target cycle count for the second mode for each dynamic block 350. The P/E cycle target component 325 may configure and store the target cycling ratio and target cycle counts for a dynamic block 350 (e.g., with an association to a specific dynamic block 350, such as a dynamic block identifier). In some cases, each of the dynamic blocks 350 may be initially configured with a same target cycling ratio. The target TBW for the memory device 340 may be configured and stored by the TBW component 335. The TBW component 335 may additionally or alternatively configure a target capacity and a target TBW for the memory device 340 (e.g., based on or in response to an estimated level of usage for a host system). The memory system controller 315 may indicate the configuration for the cache 355 including the configured parameters to the memory device 340 via the connection 305 (e.g., command signaling sent using the connection 305). In some examples, the memory device 340 may be configured (e.g., pre-configured) with the cache 355 and corresponding parameters.

As the memory device 340 is accessed by a host system (e.g., during a product runtime), the P/E cycle count component 320 may track a ratio of cycles performed in the first mode to cycles performed in the second mode for each dynamic block 350 in the cache 355. The memory system controller 315 (e.g., using the P/E cycle count component 320) may store the ratio of cycles performed for each dynamic block 350 and update the stored ratio throughout the lifetime of the memory device 340. Additionally or alternatively, during runtime, the TBW component 335 may track a TBW to the cache 355. The memory system controller 315 (e.g., using the TBW component 335) may store the TBW to the cache 355 (e.g., an actual TBW) and the target TBW configured for the cache 355. In some examples, the TBW component 335 may determine the TBW to the cache 355 based on or in response to a quantity of cycles performed for each dynamic block 350, which may be tracked by the P/E cycle count component 320.

The periodicity component 330 may determine a periodicity or other schedule (e.g., an aperiodic schedule) for monitoring and in some examples updating target cycling ratios for the dynamic blocks 350 in the cache 355. The periodicity may be determined based on or in response to an estimated level of usage by the host system. If the periodicity is relatively short, the memory system controller 315 may account for irregular data (e.g., data that may not accurately represent the host system's typical usage). As such, the periodicity component 330 may select a periodicity that provides sufficient time for obtaining accurate host system data usage (e.g., the periodicity may be days, weeks, months, or some other duration).

The one or more triggers for switching the dynamic blocks 350 from the first mode to the second mode or from the second mode to the first mode, as described with reference to FIG. 2, may be identified by the logic component 345. For example, the logic component may identify if a write command is received for the memory device 340, if an erase command is received for the memory device 340, whether a capacity of the memory device 340 is above or below a threshold capacity, whether a capacity of the cache 355 is above or below a threshold capacity, or any combination thereof.

The logic component 345 may select one or more of the dynamic blocks 350 to switch from the first mode to the second mode or from the second mode to the first mode in response to identifying one or more of the triggers and in accordance with the cycle counts for the one or more dynamic blocks 350, as described with reference to FIG. 2. The logic component 345 may receive signaling indicating a first cycle count in the first mode and a second cycle count in the second mode (e.g., current cycle counts) for each dynamic block 350 from the P/E cycle count component 320. The logic component 345 may receive signaling indicating a target cycle ratio for each dynamic block 350 from the P/E cycle target component 325. The logic component 345 may compare the first and second cycle counts within the periodicity interval with the target cycling ratio to identify a first set of dynamic blocks 350 that are associated with a lesser ratio of cycles in the first mode to cycles in the second mode than the target cycling ratio and a second set of dynamic blocks 350 that are associated with a greater ratio of cycles in the first mode to cycles in the second mode than the target cycling ratio.

If the logic component 345 determines relatively more dynamic blocks 350 may be programmed in the first mode (e.g., in response to identifying a trigger), the logic component 345 may select one or more dynamic blocks 350 from the first set. If the logic component 345 determines relatively more dynamic blocks 350 may be programmed in the second mode (e.g., in response to identifying a trigger), the logic component 345 may select one or more dynamic blocks 350 from the second set. The logic component 345 may send an indication of the selected blocks and the respective mode for programming the selected blocks to the memory device 340 over the connection 305.

The logic component 345 may adjust the cycling targets for one or more of the dynamic blocks 350 according to a level of usage of the memory device 340 and the cache 355, as described with reference to FIG. 2. The logic component 345 may compare a current TBW to the cache 355 with an adjusted target TBW (e.g., a second threshold TBW) for the cache 355 at one or more intervals in accordance with the periodicity indicated by the periodicity component 330. The logic component 345 may receive signaling indicating the current TBW and the second threshold TBW for the cache 355 from the TBW component 335. In some examples, the TBW component 335 may calculate the second threshold TBW based on or in response to the target TBW (e.g., a first threshold TBW) for the cache 355 and the periodicity. In one example, if a lifetime of the cache 355 is three years and the periodicity is six months, the second threshold TBW for a first interval (e.g., the first six months of using the cache 355) may be one sixth of the target TBW for the cache 355.

If the TBW to the cache 355 during the periodicity interval is less than the second threshold TBW for the cache 355, the logic component 345 may indicate a decreased first target count for the first mode and an increased second target count for the second mode for the one or more dynamic blocks 350 to the P/E cycle target component 325. If the TBW to the cache 355 during the periodicity interval is greater than the second threshold TBW for the cache 355, the logic component 345 may indicate an increased first target count for the first mode and a decreased second target count for the second mode for the one or more dynamic blocks 350 to the P/E cycle target component 325. The P/E cycle target component 325 may store the updated target cycling counts accordingly. Alternatively, the logic component 345 may determine not to update the target cycling counts based on or in response to the TBW to the cache 355 during the periodicity interval being relatively close to the second threshold TBW for the cache 355 (e.g., within an error threshold).

Additionally or alternatively, the logic component 345 may determine (e.g., track) a wear leveling status for the dynamic blocks 350 based on or in response to a quantity of erases performed on the dynamic blocks 350 within each periodicity interval, as described with reference to FIG. 2. The logic component 345 may select one or more dynamic blocks 350 to program according to the first mode or the second mode in response to determining the wear leveling status.

A memory system controller 315 may thereby include one or more components for configuring a memory device 340 with a cache 355, a target TBW for the cache 355, and target cycling ratios for each dynamic block 350 within the cache 355. The memory system controller 315 may include one or more components for dynamically switching modes for programming the dynamic blocks 350, adjusting the target cycling ratios for the dynamic blocks 350, or both, to improve performance and overprovisioning.

Figure 4:
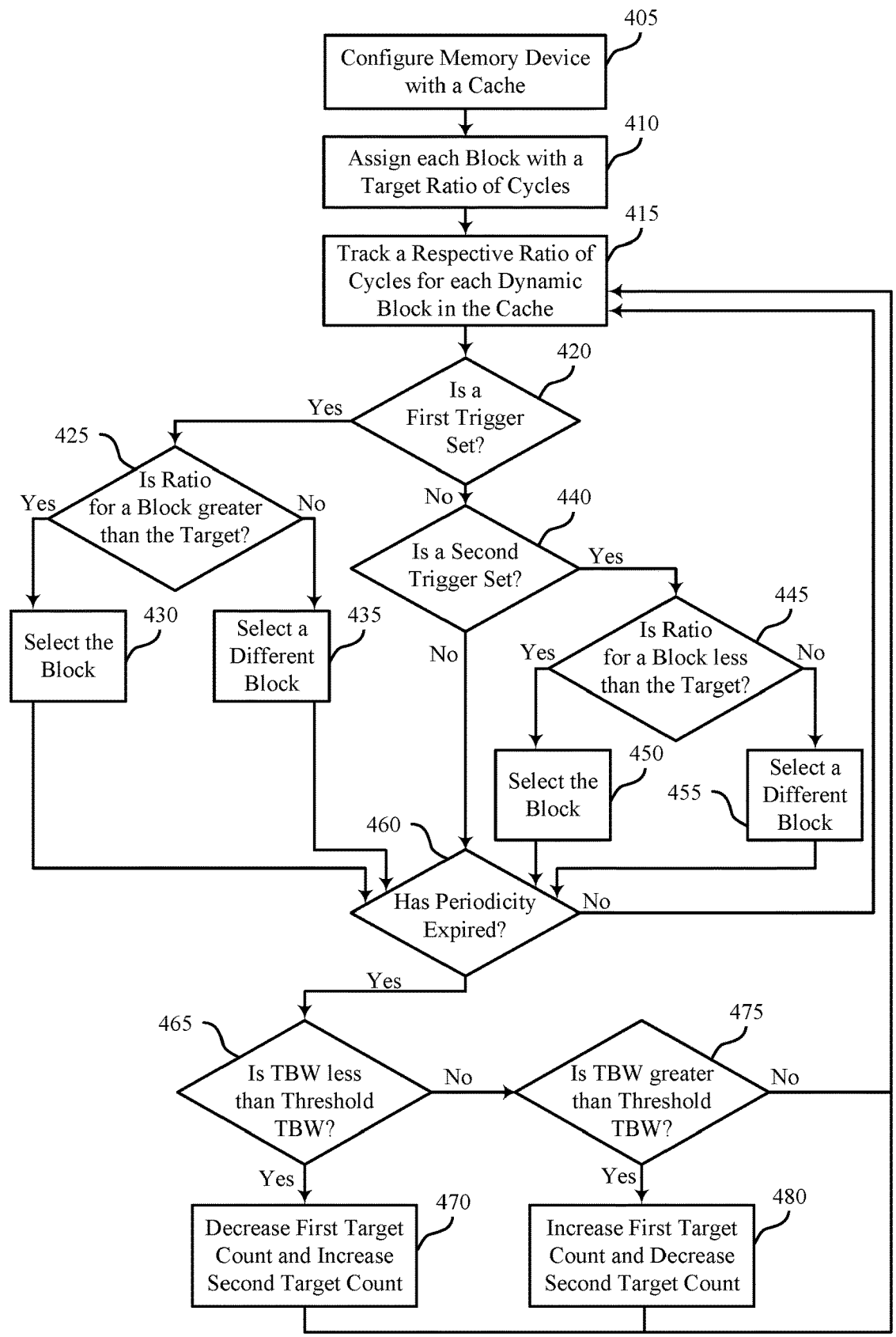
FIG. 4 illustrates an example of a flow diagram that supports cache block budgeting techniques in accordance with examples as disclosed herein.

FIG. 4 illustrates an example of a flow diagram 400 that supports cache block budgeting techniques in accordance with examples as disclosed herein. The flow diagram 400 may illustrate a process that may be implemented by a system 100 (or one or more components thereof), a system 200 (or one or more components thereof), or a memory system 300 (or one or more components thereof) as described with reference to FIGS. 1-3. The flow diagram 400 may illustrate a process for managing blocks within a cache to improve performance, endurance, and capacity of the cache and a corresponding memory device, as described with reference to FIGS. 1-3.

Aspects of the flow diagram 400 may be implemented by a controller (e.g., a memory system controller), among other components. Additionally or alternatively, aspects of the flow diagram 400 may be implemented as instructions stored in memory (e.g., firmware stored in a memory coupled with a memory device, the memory system controller, or both). For example, the instructions, if executed by a controller (e.g., the memory system controller or a storage controller), may cause the controller to perform the operations of the flow diagram 400. Alternative examples of the flow diagram 400 may be implemented in which some operations are performed in a different order than described or are not performed at all. In some cases, operations may include features not mentioned below, or additional operations may be added.

At 405, a memory device is configured with a cache. For example, the memory device may receive a configuration for a cache from a memory system controller. The configuration may be received at a controller or other component of the memory device. The configuration may indicate a first subset of blocks in the cache configured to statically operate in a first mode and a second subset of blocks in the cache configured to dynamically switch between operating in the first mode and a second mode. As described with reference to FIGS. 1-3, a block operating in the first mode may be configured to store a first quantity of bits per memory cell and a block operating in the second mode may be configured to store a second quantity of bits per memory cell that is greater than the first quantity of bits per memory cell.

At 410, each block of the second subset of blocks (e.g., the dynamic blocks) in the cache may be assigned with a target ratio of cycles performed in the first mode to cycles performed in the second mode according to a respective first target count for the first mode and a respective second target count for the second mode. The target ratio of cycles for each block may be configured based on or in response to a threshold TBW for the cache.

At 415, a respective ratio of cycles performed in the first mode to cycles performed in the second mode for each block of the second subset of blocks in the cache may be tracked, stored, or both. In some examples, the memory system controller may track and store the respective ratio as the memory device is used by a host system.

At 420, it may be determined whether a first trigger to switch a block of the second subset of blocks from the first mode to the second mode is set. The first trigger may be a capacity of the memory device failing to satisfy a threshold capacity, a command indicating to write data to the memory device, or both. At 425, if the first trigger is set (e.g., a trigger bit is set to a value indicating that the memory system detected the first trigger), it may be determined whether a ratio for a block (e.g., as tracked at 415) is greater than a respective target ratio for the block. For example, it may be determined whether a quantity of P/E cycles performed in the first mode is greater than a target quantity of P/E cycles in the first mode for the block.

At 430, if the respective ratio is greater than the target ratio for the block (e.g., the ratio of PIE cycles performed in the first mode to P/E cycles performed in the second mode is greater than the target ratio), the block may be selected. For example, the block may be selected from the second subset of blocks to switch from the first mode to the second mode responsive to identifying the first trigger. In some examples, the memory system controller may select the block and program the block in the second mode for a subsequent P/E cycle. At 435, if the respective ratio is less than the target ratio for the block (e.g., the ratio of P/E cycles performed in the first mode to P/E cycles performed in the second mode is less than the target ratio), another block may be selected and the block may remain in the first mode for one or more subsequent cycles.

At 440, if the first trigger is not set (e.g., if the first trigger is not identified), it may be determined whether a second trigger to switch a block of the second subset of blocks from the second mode to the first mode is set. The second trigger may be a capacity of the memory device satisfying a threshold capacity, a command indicating to delete data from the memory device, or both.

At 445, if the second trigger is set (e.g., if the second trigger is identified), it may be determined whether a ratio for the block (e.g., as tracked at 415) is less than a respective target ratio for the block. For example, it may be determined whether a ratio of P/E cycles performed in the first mode to P/E cycles performed in the second mode is less than the target ratio.

At 450, if the respective ratio is less than the target ratio for the block, the block may be selected. For example, the block may be selected from the second subset of blocks to switch from the second mode to the first mode responsive to identifying the first trigger. In some examples, the memory system controller may select the block and program the block in the first mode for a subsequent P/E cycle. At 455, if the respective ratio is greater than the target ratio for the block, another block may be selected and the block may remain in the second mode for one or more subsequent cycles.

At 460, it may be determined whether a periodicity has expired. In some examples, the periodicity may be a configured periodicity. The periodicity may be configured, stored, or both, by a periodicity component of the memory system controller, as described with reference to FIG. 3. If the periodicity has not expired, the process may repeat. For example, the memory system controller may continue to track respective ratios of cycles for the dynamic blocks at 415.

At 465, if the periodicity has expired, it may be determined whether a current TBW for the cache is less than a second threshold TBW for the cache. The second threshold TBW may be calculated in accordance with the threshold TBW configured for the cache and a timing associated with the periodicity. For example, if the periodicity expires six times throughout a life of the memory system, the second threshold TBW at a first time the periodicity expires may be one sixth of the threshold TBW for the cache. The second threshold TBW at a second time the periodicity expires may be two sixths of the threshold TBW for the cache. In some examples, the TBW for the cache, the threshold TBW for the cache, the second threshold TBW for the cache, or any combination thereof, may be configured, tracked, or stored by the memory system controller, as described with reference to FIG. 3.

At 470, if the TBW for the cache is less than the second threshold TBW for the cache, a first target count for the first mode for at least one block of the second subset of blocks may be decreased and a second target count for the second mode for the at least one block of the second subset of blocks may be increased. Accordingly, a target ratio of cycles performed in the first mode to cycles performed in the second mode for at least one dynamic block may decrease. In some examples, a P/E cycle target component of the memory system controller may adjust the target ratio for the at least one block and may store the adjusted ratio, as described with reference to FIG. 3.

At 475, if the TBW for the cache is greater than or equal to the second threshold TBW for the cache, it may be determined whether the current TBW for the cache is greater than a third threshold TBW for the cache. In some examples, the third threshold TBW may be the same as the second threshold TBW. Additionally or alternatively, the third TBW may be different than (e.g., greater than) the second threshold TBW, such that the targets may not be adjusted if the actual TBW for the cache falls within the range between the second threshold TBW and the third threshold TBW for the cache. The third threshold TBW may be calculated in accordance with the threshold TBW for the cache and the periodicity.

At 480, if the TBW for the cache is greater than the third threshold TBW for the cache, a first target count for the first mode for at least one block of the second subset of blocks may be increased and a second target count for the second mode for the at least one block of the second subset of blocks may be decreased. Accordingly, a target ratio of cycles performed in the first mode to cycles performed in the second mode for at least one dynamic block may increase.

If the actual TBW for the cache is less than or equal to the third threshold TBW for the cache, the target ratio of cycles may be maintained. For example, the memory system controller may refrain from adjusting one or more target ratios based on or in response to the actual TBW for the cache being within a threshold range of the target TBW for the cache. Upon either adjusting or determining not to adjust the target ratios, the memory system controller may continue to track respective ratios of cycles for the dynamic blocks at 415.

Figure 5:
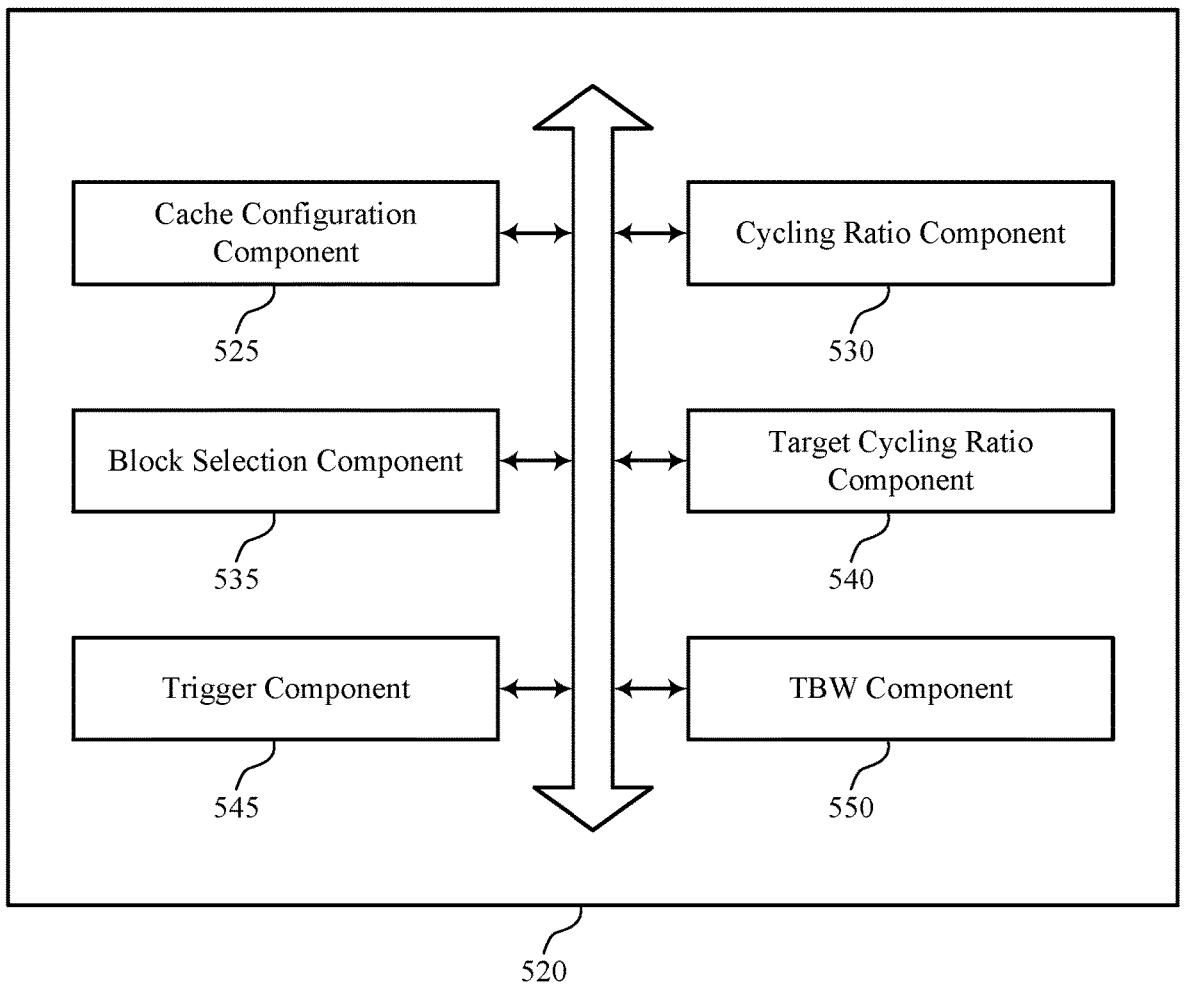
FIG. 5 shows a block diagram of a memory system that supports cache block budgeting techniques in accordance with examples as disclosed herein.

FIG. 5 shows a block diagram 500 of a memory system 520 that supports cache block budgeting techniques in accordance with examples as disclosed herein. The memory system 520 may be an example of aspects of a memory system 110, 210, or 300, as described with reference to FIGS. 1-3. The memory system 520, or various components thereof, may be an example of means for performing various aspects of cache block budgeting techniques as described herein. For example, the memory system 520 may include a cache configuration component 525, a cycling ratio component 530, a block selection component 535, a target cycling ratio component 540, a trigger component 545, a TBW component 550, or any combination thereof. Each of these components may communicate, directly or indirectly, with one another (e.g., via one or more buses).

The cache configuration component 525 may be configured as or otherwise support a means for configuring a memory device with a cache including a first subset of blocks configured to statically operate in a first mode and a second subset of blocks configured to dynamically switch between operating in the first mode and a second mode, where a first block operating in the first mode is configured to store a first quantity of bits per memory cell and a second block operating in the second mode is configured to store a second quantity of bits greater than the first quantity of bits per memory cell. The cycling ratio component 530 may be configured as or otherwise support a means for storing, for each block of the second subset of blocks, a respective ratio of cycles performed in the first mode to cycles performed in the second mode. The block selection component 535 may be configured as or otherwise support a means for selecting a block from the second subset of blocks to switch from the first mode to the second mode or from the second mode to the first mode responsive to a trigger and based on (e.g., using) the respective ratio for the block.

In some examples, the target cycling ratio component 540 may be configured as or otherwise support a means for assigning, based on (e.g., in response to) a threshold TBW for the cache, each block of the second subset of blocks a respective target ratio of cycles performed in the first mode to cycles performed in the second mode according to a respective first target count for the first mode and a respective second target count for the second mode.

In some examples, the trigger component 545 may be configured as or otherwise support a means for identifying the trigger to switch the block from the first mode to the second mode. In some examples, the cycling ratio component 530 may be configured as or otherwise support a means for determining the respective ratio for the block is greater than the respective target ratio for the block based on (e.g., in response to) identifying the trigger, where the block is selected based on (e.g., in response to) the determining. In some examples, the trigger includes a current capacity of the memory device failing to satisfy a threshold capacity, a command indicating to write data to the memory device, or both.

In some examples, the trigger component 545 may be configured as or otherwise support a means for identifying the trigger to switch the block from the second mode to the first mode. In some examples, the cycling ratio component 530 may be configured as or otherwise support a means for determining the respective ratio for the block is less than the respective target ratio for the block based on (e.g., in response to) identifying the trigger, where the block is selected based on (e.g., in response to) the determining. In some examples, the trigger includes a current capacity of the memory device satisfying a threshold capacity, a command indicating to delete data from the memory device, or both.

In some examples, the TBW component 550 may be configured as or otherwise support a means for comparing a current TBW for the cache at a first time to a second threshold TBW for the cache at the first time, the second threshold TBW being based on (e.g., calculated using) the threshold TBW for the cache and the first time. In some examples, the target cycling ratio component 540 may be configured as or otherwise support a means for modifying a target ratio for at least one block of the second subset of blocks based on (e.g., in response to) the comparing.

In some examples, the current TBW for the cache is less than the second threshold TBW for the cache at the first time, and the target cycling ratio component 540 may be configured as or otherwise support a means for modifying the target cycling ratio by decreasing a first target cycling count for the first mode for the at least one block of the second subset of blocks based on (e.g., in response to) the current TBW being less than the second threshold TBW and increasing a second target cycling count for the second mode for the at least one block of the second subset of blocks based on (e.g., in response to) the current TBW being less than the second threshold TBW.

In some examples, the current TBW for the cache is greater than the second threshold TBW for the cache at the first time, and the target cycling ratio component 540 may be configured as or otherwise support a means for modifying the target cycling ratio by increasing a first target count for the first mode for the at least one block of the second subset of blocks based on (e.g., in response to) the current TBW being greater than the second threshold TBW and decreasing a second target count for the second mode for the at least one block of the second subset of blocks based on (e.g., in response to) the current TBW being greater than the second threshold TBW. In some examples, the comparing is performed according to a configured periodicity.

In some examples, the cache configuration component 525 may be configured as or otherwise support a means for assigning the first subset of blocks and the second subset of blocks to the cache based on (e.g., in response to) a threshold capacity for the memory device. In some examples, the cache configuration component 525 may be configured as or otherwise support a means for assigning blocks to the first subset of blocks or the second subset of blocks based on (e.g., in response to) a threshold TBW for the cache.

In some examples, the first block operating in the first mode stores first data in an SLC and the second block operating in the second mode stores second data in an MLC, a TLC, or a QLC. In some examples, the first block operating in the first mode stores first data in an MLC and the second block operating in the second mode stores second data in a TLC or a QLC. In some examples, the first block operating in the first mode stores first data in a TLC and the second block operating in the second mode stores second data in a QLC. In some examples, the memory device includes a NAND memory device.

Figure 6:
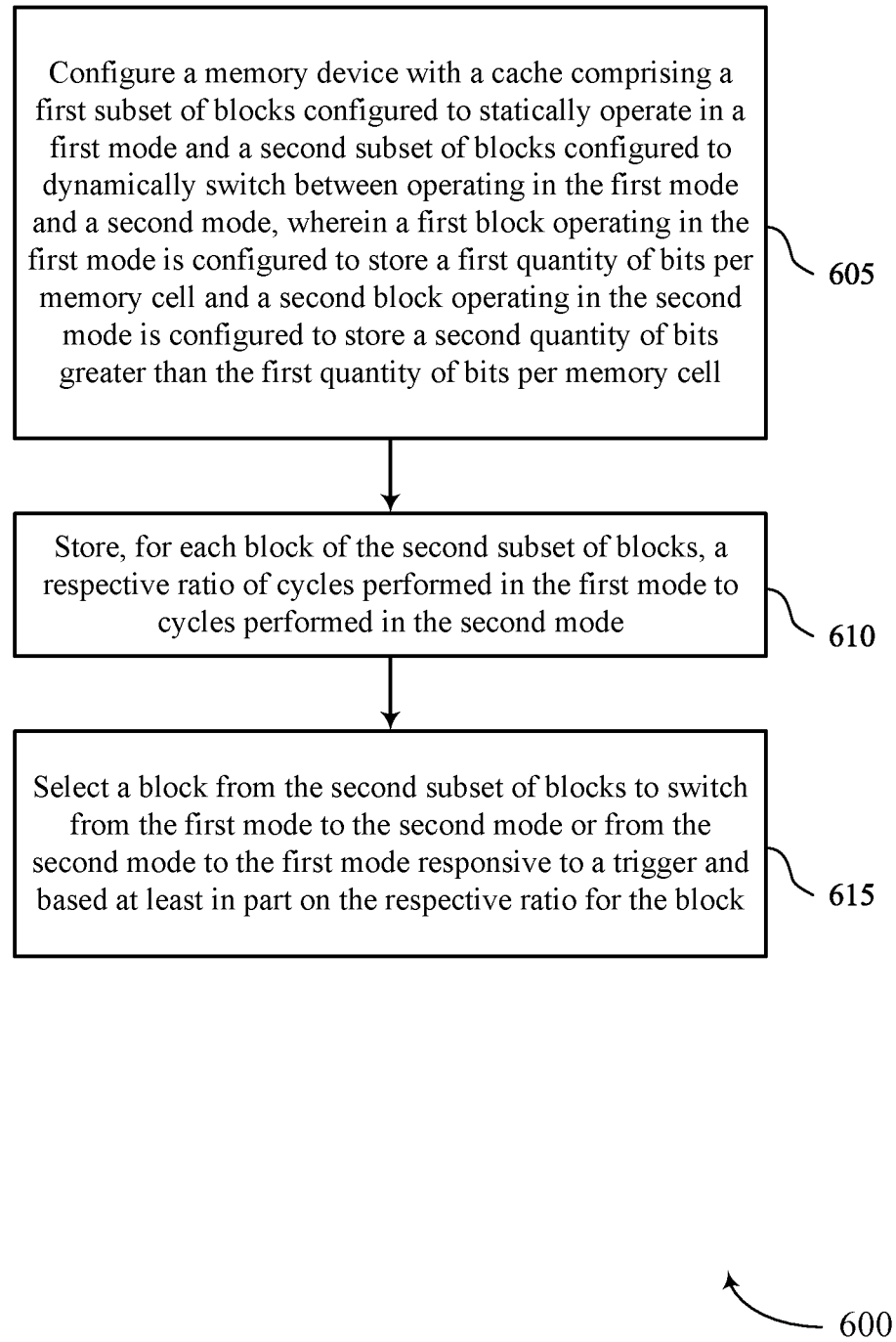
FIG. 6 shows a flowchart illustrating a method or methods that support cache block budgeting techniques in accordance with examples as disclosed herein.

FIG. 6 shows a flowchart illustrating a method 600 that supports cache block budgeting techniques in accordance with examples as disclosed herein. The operations of method 600 may be implemented by a memory system or its components as described herein. For example, the operations of method 600 may be performed by a memory system as described with reference to FIGS. 1-5. In some examples, a memory system may execute a set of instructions to control the functional elements of the device to perform the described functions. Additionally or alternatively, the memory system may perform aspects of the described functions using special-purpose hardware.

At 605, the method may include configuring a memory device with a cache including a first subset of blocks configured to statically operate in a first mode and a second subset of blocks configured to dynamically switch between operating in the first mode and a second mode, where a first block operating in the first mode is configured to store a first quantity of bits per memory cell and a second block operating in the second mode is configured to store a second quantity of bits greater than the first quantity of bits per memory cell. The operations of 605 may be performed in accordance with examples as disclosed herein. In some examples, aspects of the operations of 605 may be performed by a cache configuration component 525 as described with reference to FIG. 5.

At 610, the method may include storing, for each block of the second subset of blocks, a respective ratio of cycles performed in the first mode to cycles performed in the second mode. The operations of 610 may be performed in accordance with examples as disclosed herein. In some examples, aspects of the operations of 610 may be performed by a cycling ratio component 530 as described with reference to FIG. 5.

At 615, the method may include selecting a block from the second subset of blocks to switch from the first mode to the second mode or from the second mode to the first mode responsive to a trigger and based on the respective ratio for the block. The operations of 615 may be performed in accordance with examples as disclosed herein. In some examples, aspects of the operations of 615 may be performed by a block selection component 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for configuring a memory device with a cache including a first subset of blocks configured to statically operate in a first mode and a second subset of blocks configured to dynamically switch between operating in the first mode and a second mode, where a first block operating in the first mode is configured to store a first quantity of bits per memory cell and a second block operating in the second mode is configured to store a second quantity of bits greater than the first quantity of bits per memory cell, storing, for each block of the second subset of blocks, a respective ratio of cycles performed in the first mode to cycles performed in the second mode, and selecting a block from the second subset of blocks to switch from the first mode to the second mode or from the second mode to the first mode responsive to a trigger and based on the respective ratio for the block.

Some examples of the method 600 and the apparatus described herein may further include operations, features, circuitry, logic, means, or instructions for assigning, based on a threshold TBW for the cache, each block of the second subset of blocks a respective target ratio of cycles performed in the first mode to cycles performed in the second mode according to a respective first target count for the first mode and a respective second target count for the second mode.

Some examples of the method 600 and the apparatus described herein may further include operations, features, circuitry, logic, means, or instructions for identifying the trigger to switch the block from the first mode to the second mode and determining the respective ratio for the block may be greater than the respective target ratio for the block based on identifying the trigger, where the block may be selected based on the determining. In some examples of the method 600 and the apparatus described herein, the trigger includes a current capacity of the memory device failing to satisfy a threshold capacity, a command indicating to write data to the memory device, or both.

Some examples of the method 600 and the apparatus described herein may further include operations, features, circuitry, logic, means, or instructions for identifying the trigger to switch the block from the second mode to the first mode and determining the respective ratio for the block may be less than the respective target ratio for the block based on identifying the trigger, where the block may be selected based on the determining. In some examples of the method 600 and the apparatus described herein, the trigger includes a current capacity of the memory device satisfying a threshold capacity, a command indicating to delete data from the memory device, or both.

Some examples of the method 600 and the apparatus described herein may further include operations, features, circuitry, logic, means, or instructions for comparing a current TBW for the cache at a first time to a second threshold TBW for the cache at the first time, the second threshold TBW being based on the threshold TBW for the cache and the first time and modifying a target ratio for at least one block of the second subset of blocks based on the comparing.

In some examples of the method 600 and the apparatus described herein, the current TBW for the cache may be less than the second threshold TBW for the cache at the first time, and the modifying the target cycling ratio may include decreasing a first target cycling count for the first mode for the at least one block of the second subset of blocks based on the current TBW being less than the second threshold TBW, and increasing a second target cycling count for the second mode for the at least one block of the second subset of blocks based on the current TBW being less than the second threshold TBW.

In some examples of the method 600 and the apparatus described herein, the current TBW for the cache may be greater than the second threshold TBW for the cache at the first time, and the modifying the target cycling ratio may include increasing a first target count for the first mode for the at least one block of the second subset of blocks based on the current TBW being greater than the second threshold TBW, and decreasing a second target count for the second mode for the at least one block of the second subset of blocks based on the current TBW being greater than the second threshold TBW. In some examples of the method 600 and the apparatus described herein, the comparing may be performed according to a configured periodicity.

Some examples of the method 600 and the apparatus described herein may further include operations, features, circuitry, logic, means, or instructions for assigning the first subset of blocks and the second subset of blocks to the cache based on a threshold capacity for the memory device. Some examples of the method 600 and the apparatus described herein may further include operations, features, circuitry, logic, means, or instructions for assigning blocks to the first subset of blocks or the second subset of blocks based on a threshold TBW for the cache.

In some examples of the method 600 and the apparatus described herein, the first block operating in the first mode stores first data in an SLC and the second block operating in the second mode stores second data in an MLC, a TLC, or a QLC, the first block operating in the first mode stores first data in an MLC and the second block operating in the second mode stores second data in a TLC or a QLC, or the first block operating in the first mode stores first data in a TLC and the second block operating in the second mode stores second data in a QLC.

In some examples of the method 600 and the apparatus described herein, the memory device includes a NAND memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
   configure the memory device with a cache comprising a first subset of blocks configured to statically operate in a first mode and a second subset of blocks configured to dynamically switch between operating in the first mode and a second mode, wherein a first block operating in the first mode is configured to store a first quantity of bits per memory cell and a second block operating in the second mode is configured to store a second quantity of bits greater than the first quantity of bits per memory cell;
   store, for each block of the second subset of blocks, a respective ratio of cycles performed in the first mode to cycles performed in the second mode; and
   select a block from the second subset of blocks to switch from the first mode to the second mode or from the second mode to the first mode responsive to a trigger and based at least in part on the respective ratio for the block.

2. The apparatus of claim 1, wherein the controller is further configured to cause the apparatus to:
   assign, based at least in part on a threshold total bytes written (TBW) for the cache, each block of the second subset of blocks a respective target ratio of cycles performed in the first mode to cycles performed in the second mode according to a respective first target count for the first mode and a respective second target count for the second mode.

3. The apparatus of claim 2, wherein the controller is further configured to cause the apparatus to:
identify the trigger to switch the block from the first mode to the second mode; and
determine the respective ratio for the block is greater than the respective target ratio for the block based at least in part on identifying the trigger, wherein the block is selected based at least in part on the determining.

4. The apparatus of claim 3, wherein the trigger comprises a current capacity of the memory device failing to satisfy a threshold capacity, a command indicating to write data to the memory device, or both.

5. The apparatus of claim 2, wherein the controller is further configured to cause the apparatus to:
identify the trigger to switch the block from the second mode to the first mode; and
determine the respective ratio for the block is less than the respective target ratio for the block based at least in part on identifying the trigger, wherein the block is selected based at least in part on the determining.

6. The apparatus of claim 5, wherein the trigger comprises a current capacity of the memory device satisfying a threshold capacity, a command indicating to delete data from the memory device, or both.

7. The apparatus of claim 2, wherein the controller is further configured to cause the apparatus to:
compare a current TBW for the cache at a first time to a second threshold TBW for the cache at the first time, the second threshold TBW being based at least in part on the threshold TBW for the cache and the first time; and
modify a target ratio for at least one block of the second subset of blocks based at least in part on the comparing.

8. The apparatus of claim 7, wherein:
the current TBW for the cache is less than the second threshold TBW for the cache at the first time; and
the controller configured to cause the apparatus to modify the target ratio is configured to cause the apparatus to:
decrease a first target count for the first mode for the at least one block of the second subset of blocks based at least in part on the current TBW being less than the second threshold TBW; and
increase a second target count for the second mode for the at least one block of the second subset of blocks based at least in part on the current TBW being less than the second threshold TBW.

9. The apparatus of claim 7, wherein:
the current TBW for the cache is greater than the second threshold TBW for the cache at the first time; and
the controller configured to cause the apparatus to modify the target ratio is configured to cause the apparatus to:
increase a first target count for the first mode for the at least one block of the second subset of blocks based at least in part on the current TBW being greater than the second threshold TBW; and
decrease a second target count for the second mode for the at least one block of the second subset of blocks based at least in part on the current TBW being greater than the second threshold TBW.

10. The apparatus of claim 7, wherein the comparing is performed according to a configured periodicity.

11. The apparatus of claim 1, wherein the controller is further configured to cause the apparatus to:
assign the first subset of blocks and the second subset of blocks to the cache based at least in part on a threshold capacity for the memory device.

12. The apparatus of claim 1, wherein the controller is further configured to cause the apparatus to:
assign blocks to the first subset of blocks or the second subset of blocks based at least in part on a threshold total bytes written (TBW) for the cache.

13. The apparatus of claim 1, wherein:
the first block operating in the first mode stores first data in a single-level cell (SLC) and the second block operating in the second mode stores second data in a multi-level cell (MLC), a tri-level cell (TLC), or a quad-level cell (QLC);
the first block operating in the first mode stores first data in an MLC and the second block operating in the second mode stores second data in a TLC or a QLC; or
the first block operating in the first mode stores first data in a TLC and the second block operating in the second mode stores second data in a QLC.

14. The apparatus of claim 1, wherein the memory device comprises a not-and memory device.

15. A non-transitory computer-readable medium storing code comprising instructions which, when executed by a processor of an electronic device, cause the electronic device to:
configure a memory device with a cache comprising a first subset of blocks configured to statically operate in a first mode and a second subset of blocks configured to dynamically switch between operating in the first mode and a second mode, wherein a first block operating in the first mode is configured to store a first quantity of bits per memory cell and a second block operating in the second mode is configured to store a second quantity of bits greater than the first quantity of bits per memory cell;
store, for each block of the second subset of blocks, a respective ratio of cycles performed in the first mode to cycles performed in the second mode; and
select a block from the second subset of blocks to switch from the first mode to the second mode or from the second mode to the first mode responsive to a trigger and based at least in part on the respective ratio for the block.

16. The non-transitory computer-readable medium of claim 15, wherein the instructions, when executed by the processor of the electronic device, further cause the electronic device to:
assign, based at least in part on a threshold total bytes written (TBW) for the cache, each block of the second subset of blocks a respective target ratio of cycles performed in the first mode to cycles performed in the second mode according to a respective first target count for the first mode and a respective second target count for the second mode.

17. The non-transitory computer-readable medium of claim 16, wherein the instructions, when executed by the processor of the electronic device, further cause the electronic device to:
identify the trigger to switch the block from the first mode to the second mode; and
determine the respective ratio for the block is greater than the respective target ratio for the block based at least in part on identifying the trigger, wherein the block is selected based at least in part on the determining.

18. The non-transitory computer-readable medium of claim 16, wherein the instructions, when executed by the processor of the electronic device, further cause the electronic device to:
identify the trigger to switch the block from the second mode to the first mode; and
determine the respective ratio for the block is less than the respective target ratio for the block based at least in part on identifying the trigger, wherein the block is selected based at least in part on the determining.

19. The non-transitory computer-readable medium of claim 16, wherein the instructions, when executed by the processor of the electronic device, further cause the electronic device to:
compare a current TBW for the cache at a first time to a second threshold TBW for the cache at the first time, the second threshold TBW being based at least in part on the threshold TBW for the cache and the first time; and
modify a target ratio for at least one block of the second subset of blocks based at least in part on the comparing.

20. The non-transitory computer-readable medium of claim 19, wherein:
the current TBW for the cache is less than the second threshold TBW for the cache at the first time; and
the instructions causing the electronic device to modify the target ratio, when executed by the processor of the electronic device, cause the electronic device to:
decrease a first target count for the first mode for the at least one block of the second subset of blocks based at least in part on the current TBW being less than the second threshold TBW; and
increase a second target count for the second mode for the at least one block of the second subset of blocks based at least in part on the current TBW being less than the second threshold TBW.

21. The non-transitory computer-readable medium of claim 19, wherein:
the current TBW for the cache is greater than the second threshold TBW for the cache at the first time; and
the instructions causing the electronic device to modify the target ratio, when executed by the processor of the electronic device, cause the electronic device to:
increase a first target count for the first mode for the at least one block of the second subset of blocks based at least in part on the current TBW being greater than the second threshold TBW; and
decrease a second target count for the second mode for the at least one block of the second subset of blocks based at least in part on the current TBW being greater than the second threshold TBW.

22. The non-transitory computer-readable medium of claim 15, wherein the instructions, when executed by the processor of the electronic device, further cause the electronic device to:
assign the first subset of blocks and the second subset of blocks to the cache based at least in part on a threshold capacity for the memory device.

23. The non-transitory computer-readable medium of claim 15, wherein the instructions, when executed by the processor of the electronic device, further cause the electronic device to:
assign blocks to the first subset of blocks or the second subset of blocks based at least in part on a threshold total bytes written (TBW) for the cache.

24. A method performed by a memory system, comprising:
configuring a memory device with a cache comprising a first subset of blocks configured to statically operate in a first mode and a second subset of blocks configured to dynamically switch between operating in the first mode and a second mode, wherein a first block operating in the first mode stores a first quantity of bits per memory cell and a second block operating in the second mode stores a second quantity of bits greater than the first quantity of bits per memory cell;
storing, for each block of the second subset of blocks, a respective ratio of cycles performed in the first mode to cycles performed in the second mode; and
selecting a block from the second subset of blocks to switch from the first mode to the second mode or from the second mode to the first mode responsive to a trigger and based at least in part on the respective ratio for the block.

25. The method of claim 24, further comprising:
assigning, based at least in part on a threshold total bytes written (TBW) for the cache, each block of the second subset of blocks a respective target ratio of cycles performed in the first mode to cycles performed in the second mode according to a respective first target count for the first mode and a respective second target count for the second mode.

* * * * *